(12) United States Patent
Koelbl et al.

(10) Patent No.: US 7,469,960 B2
(45) Date of Patent: Dec. 30, 2008

(54) VEHICLE ROOF COMPRISING A ROLLER BLIND SYSTEM

(75) Inventors: Michael Koelbl, Neuried (DE);
Wolfgang Suess, Freising (DE);
Horst-Martin Schulz, Weil (DE); Karin Langguth, Gauting (DE); Michaela Nowak, Munich (DE); Thomas Rudolph, Hechendorf (DE)

(73) Assignee: Webasto AG, Stockdorf (DE)

( * ) Notice: Subject to any disclaimer, the term of this patent is extended or adjusted under 35 U.S.C. 154(b) by 50 days.

(21) Appl. No.: 11/568,358

(22) PCT Filed: Apr. 20, 2005

(86) PCT No.: PCT/EP2005/004208

§ 371 (c)(1),
(2), (4) Date: Oct. 26, 2006

(87) PCT Pub. No.: WO2005/102753

PCT Pub. Date: Nov. 3, 2005

(65) Prior Publication Data
US 2008/0036245 A1    Feb. 14, 2008

(30) Foreign Application Priority Data
Apr. 26, 2004   (DE)   ................. 10 2004 020 336

(51) Int. Cl.
B60J 3/02   (2006.01)
B60J 7/00   (2006.01)

(52) U.S. Cl. .................. 296/214; 160/241; 160/244; 160/245

(58) Field of Classification Search ............... 296/214; 160/241–245
See application file for complete search history.

(56) References Cited

U.S. PATENT DOCUMENTS

| 112,814 | A | * | 3/1871 | Kennedy | ............ 160/244 |
|---|---|---|---|---|---|
| 119,983 | A | * | 10/1871 | Hobart | ............ 160/244 |
| 126,458 | A | * | 5/1872 | Hazzard | ............ 160/247 |
| 224,287 | A | * | 2/1880 | Gilman et al. | ............ 160/244 |
| 259,156 | A | * | 6/1882 | Hopkins | ............ 160/244 |
| 840,682 | A | * | 1/1907 | Bell | ............ 160/244 |

(Continued)

FOREIGN PATENT DOCUMENTS

DE   19722722 A1   12/1998

(Continued)

*Primary Examiner*—Dennis H Pedder
(74) *Attorney, Agent, or Firm*—Marshall, Gerstein & Borun LLP

(57) ABSTRACT

A motor vehicle roof with an at least partially transparent roof section (10) and a shade arrangement (12) located underneath the transparent roof section. In one of three embodiments, with two take-up shafts (16, 18) located in succession in the lengthwise direction of the roof and a length of shade (14) which extends in between, and the front end of the length of shade can be taken up onto the front take-up shaft and the back end onto the rear take-up shaft, the two take-up shafts each being pre-tensioned in the take-up direction, the two take-up shafts being movable along one laterally arranged guide in the lengthwise direction of the roof, and there being a common drive (70, 72, 74, 76) in order to move the take-up shafts (16, 18) in opposite directions toward one another in the lengthwise direction of the roof.

9 Claims, 4 Drawing Sheets

U.S. PATENT DOCUMENTS

| | | | | |
|---|---|---|---|---|
| 1,201,591 | A | * | 10/1916 | Joseph ........................ 160/29 |
| 1,438,669 | A | * | 12/1922 | Spencer ...................... 160/244 |
| 1,464,412 | A | * | 8/1923 | Dillon ..................... 160/304.1 |
| 1,870,920 | A | * | 8/1932 | McNulty .................... 160/244 |
| 6,520,569 | B2 | | 2/2003 | Wingen et al. |
| 6,682,133 | B2 | | 1/2004 | Glasl |
| 7,008,009 | B2 | * | 3/2006 | Grimm et al. ............... 296/214 |
| 2003/0094249 | A1 | * | 5/2003 | Zimmermann et al. . 160/370.22 |

FOREIGN PATENT DOCUMENTS

| | | |
|---|---|---|
| DE | 10140239 A1 | 3/2003 |
| DE | 10206161 A1 | 9/2003 |
| DE | 10230443 A1 | 1/2004 |
| FR | 2786809 A1 | 6/2000 |

* cited by examiner

VEHICLE ROOF COMPRISING A ROLLER BLIND SYSTEM

BACKGROUND OF THE INVENTION

1. Field of the Invention

This invention relates to a motor vehicle roof with a shade arrangement located underneath an at least partially transparent roof section.

2. Description of Related Art

Conventionally, a shade arrangement for a vehicle roof with a transparent roof section comprises a body-mounted take-up shaft which is pre-tensioned in the take-up direction in order to take up a length of shade. Furthermore, a pull for pulling out the length of shade is provided on the front end of the shade.

German Patent Application DE 101 40 239 A1 describes a shade arrangement for a vehicle roof in which there is a take-up shaft which is guided to move on lateral guides of the vehicle roof and which can be moved between a lowered, rear rest position and an operating position under a transparent roof area. On the front end of the length of shade, there is a pull which is driven by a drive to extend the length of shade. For lateral guidance of the take-up shaft and the pull, there is a common lateral guide rail. The drive of the take-up shaft and of the pull takes place via compressively stiff drive cables by means of two separate motors.

Furthermore, vehicle roofs are known in which, underneath a transparent roof section, there are two separate shade arrangements in succession in the lengthwise direction of the roof, each shade arrangement having a take-up shaft with a length of shade which can be wound onto it; see, for example, German Patent Application DE 100 19 664 A1 (which corresponds to U.S. Pat. No. 6,520,569), German Patent DE 101 24 100 C1 (which corresponds to U.S. Pat. No. 6,682,133), and German Patent Applications DE 102 06 161 A1 and DE 102 30 443 A1. In this connection, the two take-up shafts can be coupled to one another by means of a coupling mechanism (see, German Patent Application DE 102 06 161 A1) or the pulls of the two lengths of shade can be coupled to one another (see, German Patent DE 101 24 100 C1).

The disadvantage in these structures with two successive shade arrangements is the relative construction effort, although, in this way, transparent roof areas with a great extension in the lengthwise direction of the roof can be shaded.

German Patent Application DE 197 22 722 A1 discloses a shading device for a vehicle roof in which there is a shade arrangement between two panes which has two take-up shafts which are stationary in the lengthwise direction of the roof, and between which a length of shade extends which can be taken up at each end onto a respective one of the two take-up shafts. The length of shade comprises two areas in the lengthwise direction of the roof that have different optical transparency. The take-up shafts can be driven by one motor or by two separate electric motors.

SUMMARY OF THE INVENTION

The object of this invention is to devise a vehicle roof with a shade arrangement in which a flexible shading function is achieved at an overall height that is as low as possible, and the shade arrangement should also be suited for shading a transparent roof section with a great extension in the lengthwise direction of the roof.

This object is achieved in accordance with the invention by a motor vehicle roof in accordance with the invention. Here, it is advantageous that, because for a common length of shade, there are two take-up shafts which are located in succession in the lengthwise direction of the roof, of which one can be moved in the lengthwise direction of the roof, on the one hand, flexible, continuous and individual adjustment of the desired shading situation being achieved, and on the other hand, a relative low overall height can be achieved, since the volume of the length of shade is distributed among the two take-up shafts when winding up and they, therefore, can be implemented with a relatively small diameter in the taken-up state. In this way, the shade arrangement is especially also suited for transparent roof sections with a relatively great extension in the lengthwise direction of the roof.

One alternative approach to the aforementioned object in accordance with the invention is implemented by a vehicle roof in which the two take-up shafts can be moved in opposite directions in the lengthwise direction of the roof by means of a common drive, by which flexible, continuous and individual adjustment of the desired shading situation can be achieved at a low overall height. Furthermore, by using a common drive, the construction effort and the amount of installation space required can be kept low.

It is another object of the invention to devise a vehicle roof with a shade arrangement which has a structure that is as simple as possible and which can still be comfortably operated.

This object is achieved by a vehicle roof in accordance with the invention in which a common drive moves the take-up shaft and pull in opposite directions toward one another in the lengthwise direction of the roof, enabling a simple structure with ease of operation to be achieved.

This invention is explained in detail below with reference to the accompanying drawings by way of example.

DETAILED DESCRIPTION OF THE INVENTION

Figure 1:
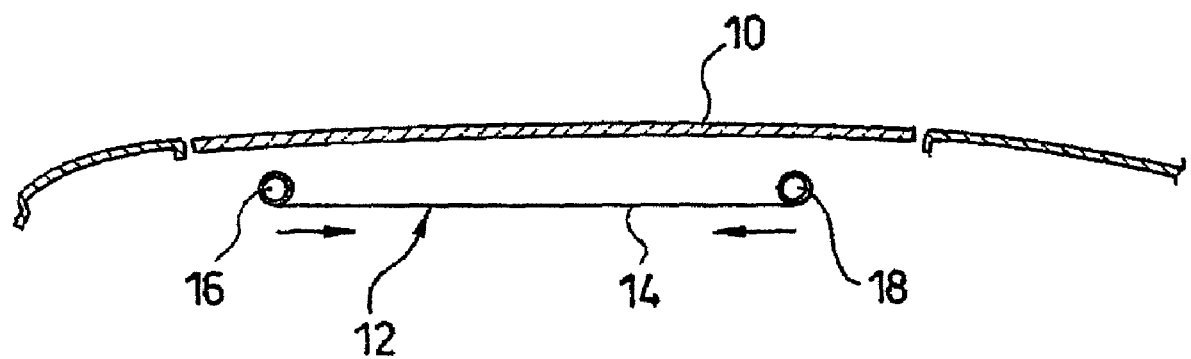
FIG. 1 is a schematic side sectional view of an example of a vehicle roof in accordance with the invention.

FIG. 1 schematically shows a vehicle roof with an at least partially transparent roof section 10, which can be a so-called panorama roof, and the transparent roof section 10 can be formed, for example, by a stationary glass or plastic pane. Alternatively, the transparent roof section can also be at least partially formed by the transparent cover of an externally guided sliding roof (not shown in FIG. 1).

Underneath the transparent roof section 10, there is a shade arrangement 12 which has a length of shade 14 and two take-up shafts 16, 18, arranged in succession in the lengthwise direction of the roof. The front end of the length of shade 14 can be wound onto the front take-up shaft 16 and the back end of the length of shade can be wound onto the rear take-up shaft 18. The two take-up shafts 16, 18 are each pre-tensioned in the take-up direction, for example, by means of a corresponding spring. This ensures that the length of shade 14 is pulled taut in any position and fold formation is prevented.

The length of shade 14 can be produced in the conventional manner, for example, from a textile material, especially in the color of the inside head liner of the vehicle roof, from netting or a film, from a shade material with holes, or from PVC material.

The two take-up shafts 16, 18 can be moved in the lengthwise direction of the roof along a body-mounted guide arranged laterally, this taking place by means of a common drive for the two take-up shafts 16, 18. In this way, continuous, individual adjustment of the desired shading situation can be easily achieved. FIG. 1 schematically shows the displacement possibilities of the two take-up shafts 16, 18, proceeding from the position shown in FIG. 1, by means of arrows.

Figure 2:
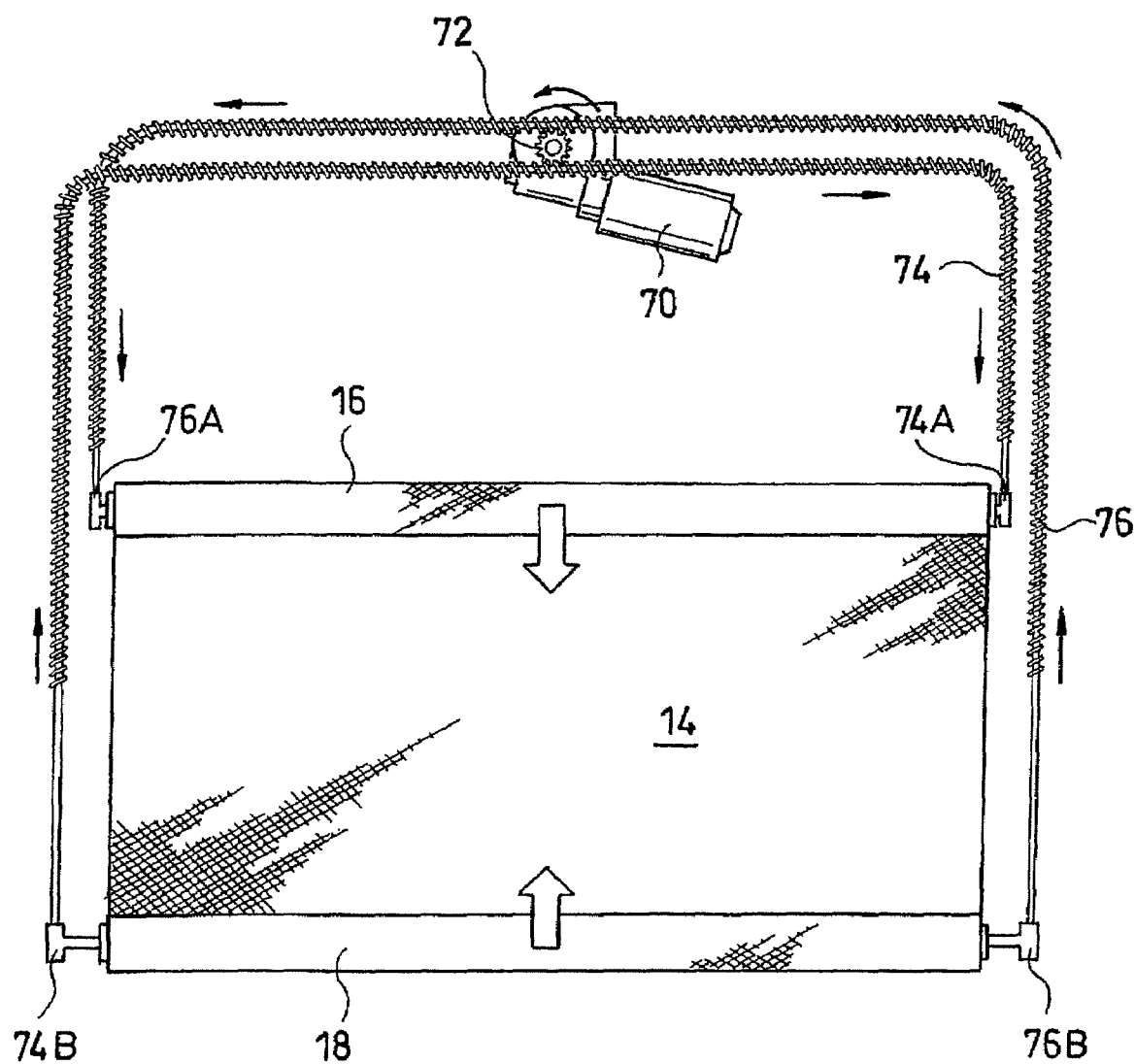
FIG. 2 is a schematic view of a shade arrangement in accordance with the invention as seen from below, a common drive being provided for two movable take-up shafts.

FIG. 2 schematically shows, in a view from underneath, an embodiment of a shade arrangement in which there is a common drive for the two take-up shafts 16, 18 which can be moved in the lengthwise direction of the roof to adjust the length of shade 14.

The drive comprises an electrical motor 70 which drives a pinion 72 into rotary motion (see arrow in FIG. 2). The opposing sides of the outside periphery of the pinion 72 meshes with two compressively stiff drive cables 74, 76 which run essentially parallel in order to drive them into displacement motion (see arrows in FIG. 13). The pinion 72 is located between the two drive cables 74, 76.

The outgoing end 74A of the drive cable 74 and the outgoing end 76A of the drive cable 76 act on a respective one of the two lateral ends of the take-up shaft 16, while the incoming end 74B of the drive cable 74 and the incoming end 76B of the drive cable 76 act on a respective one of the two lateral ends of the take-up shaft 18 (the designation "outgoing" and "incoming" relates to movement of the cables for the direction of rotation of the pinion 72 shown in FIG. 13, by way of example). For the direction of rotation of the pinion 72 shown in FIG. 2, the take-up shafts 16, 18 move in opposite directions toward one another, by which the area shaded by the length of shade 14 is reduced mirror-symmetrically toward the middle. By opposite rotation of the pinion 72, the two take-up shafts 16, 18 can be again pushed away from one another, in order to again enlarge the area shaded by the length of shade 14. Overall, with the illustrated construction, only a mirror-symmetrical displacement of the take-up shafts 16, 18 relative to one another is possible, but not common displacement of the two take-up shafts 16, 18 in the lengthwise direction of the roof.

Figure 3:
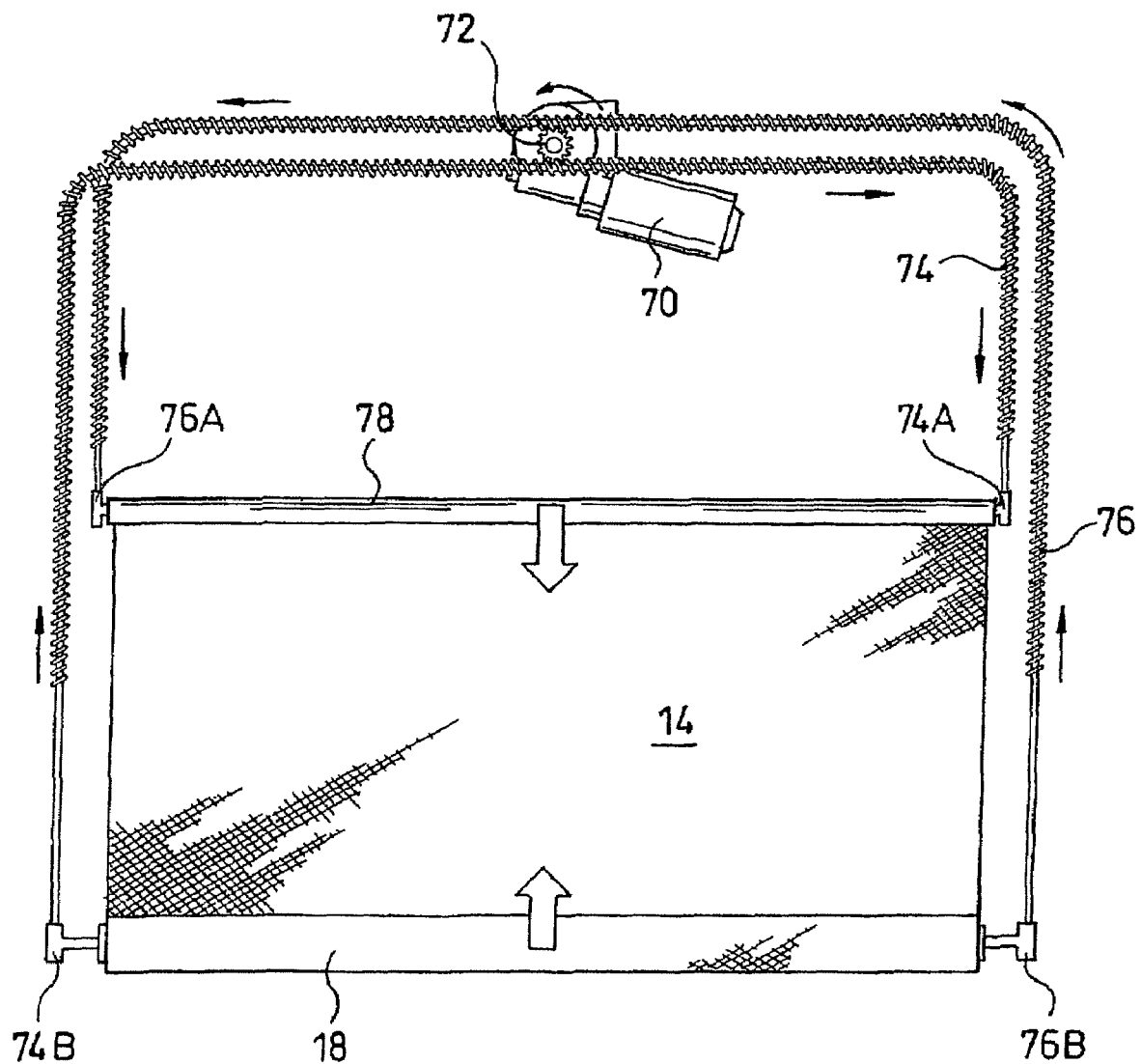
FIG. 3 is a view like FIG. 2, but showing an arrangement in which one of the two take-up shafts has been replaced by a pull.

FIG. 3 shows an embodiment which has been modified with respect to FIG. 2, the front take-up shaft 16 being replaced by a pull which is connected securely to the free end of the length of shade 14 and which is similarly supported to be able to move laterally in the lengthwise direction of the roof like the take-up shaft 16.

Figure 4:
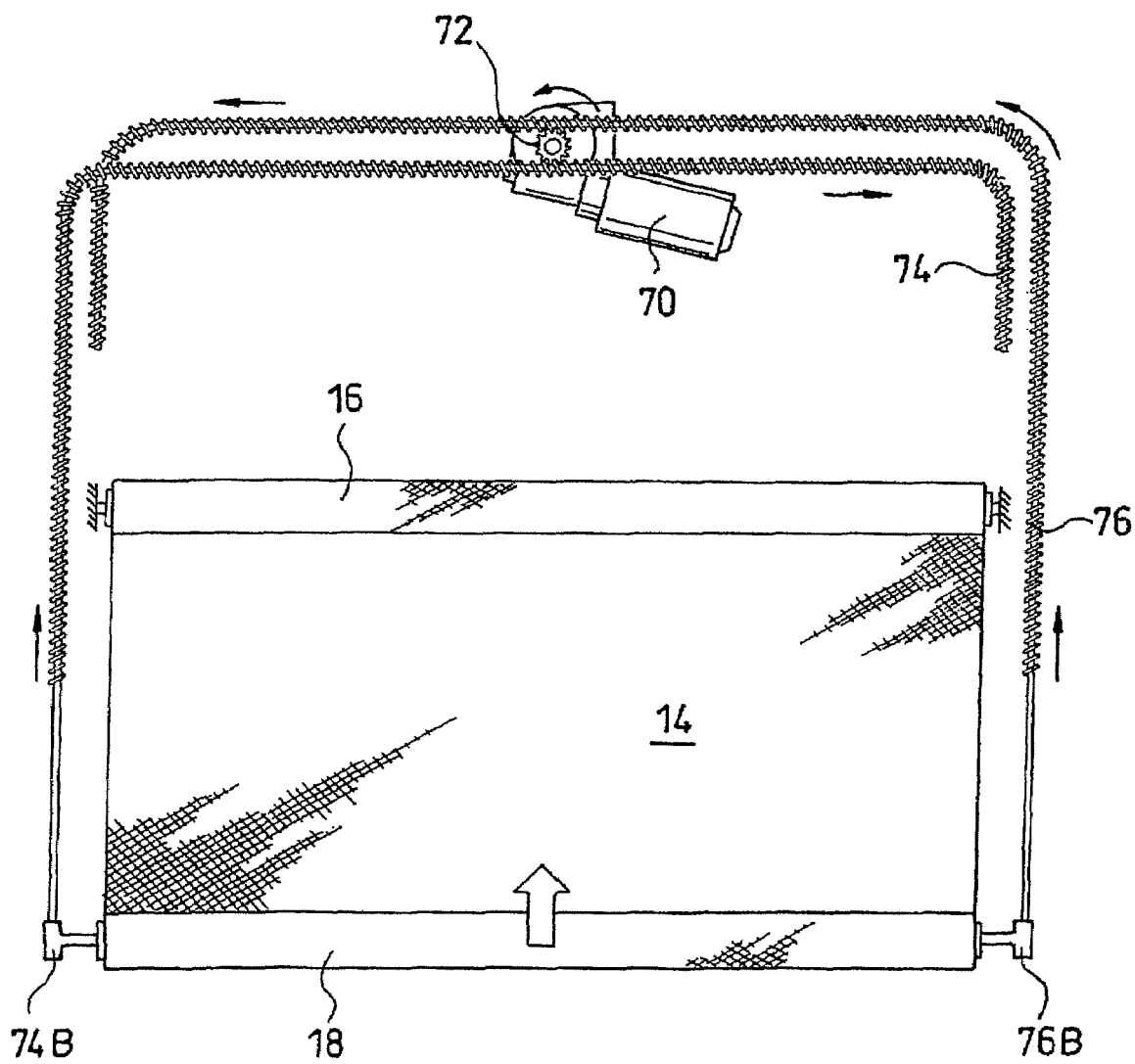
FIG. 4 shows a view like FIG. 2, but showing an arrangement in which one of the two take-up shafts is displaceably driven, while the other cannot be moved.

FIG. 4 shows another embodiment which has been modified with respect to that of FIG. 2 in that the front take-up shaft 16 is stationary in the lengthwise direction of the roof, and accordingly, is not connected to the drive cables 74, 76.

The invention claimed is:

1. Motor vehicle roof, comprising:
    an at least partially transparent roof section,
    a shade arrangement located underneath the transparent roof section,
    front and rear take-up shafts located in succession in the lengthwise direction of the roof,
    a length of shade which extends between the take-up shafts, a front end of the length of shade being connected to be rolled onto and off the front take-up shaft and a back end of the length of shade being connected to be rolled onto and off the rear take-up shaft, the two take-up shafts each being pre-tensioned in a take-up direction, and both of the take-up shafts being movable in the lengthwise direction of the roof for rolling the shade on and off both of the take-up shafts, and
    at least one drive cable adapted to be driven by a drive, the drive cable having a first end that acts laterally in a first direction on one of the front and rear take-up shafts and a second end that acts laterally in a second direction, which is opposite the first direction, on the other of the front and rear take-up shafts.

2. Motor vehicle roof as claimed in claim 1, wherein the drive comprises a motor and the at least one drive cable comprises two compressively stiff drive cables which are driven in opposite directions by the motor and which act laterally on the movable take-up shafts.

3. Motor vehicle roof as claimed in claim 2, wherein each of the two drive cables has a first end that acts laterally in the first direction on one of the take-up shafts and a second end that acts laterally in the second direction on the other of the take-up shafts.

4. Motor vehicle roof as claimed in claim 3, wherein end areas of each of the two drive cables which move in the same direction with respect to the motor act on the same take-up shaft.

5. Motor vehicle roof as claimed in claim 2, wherein the motor drives the drive cables by means of a common pinion, the two cables running essentially parallel in an area of the pinion, the pinion being located between the two drive cables each drive cable engaging the pinion on a respective one of opposite sides of the pinion.

6. Motor vehicle roof, comprising:
    an at least partially transparent roof section,
    a shade arrangement located underneath the transparent roof section,
    a take-up shaft and a pull located in succession in the lengthwise direction of the roof,
    a length of shade which extends between the take-up shaft and the pull, one end of the length of shade being connected to be rolled onto and off the take-up shaft and an opposite end of the length of shade being connected to the pull, the take-up shaft being pre-tensioned in a take-up direction; and
    wherein the take-up shaft and the pull are movable in the lengthwise direction of the roof in opposite directions toward and away from one another in the lengthwise direction of the roof by a common drive and at least one drive cable having a first end that acts laterally in a first direction on one of the take-up shaft and the pull and a second end that acts laterally in a second direction, which is opposite the first direction, on the other of the take-up shaft and the pull.

7. Motor vehicle roof as claimed in claim 6, wherein the drive comprises a motor and the at least one drive cable comprises two compressively stiff drive cables that are driven in opposite directions by the motor, wherein each of the drive cables has one end that acts laterally on the take-up shaft and an opposite end that acts on the pull, and wherein end areas of each of the two drive cables which move in the same direction with respect to the motor act on the same one of the take-up shaft and pull.

8. Motor vehicle roof as claimed in claim 7, wherein the motor drives the drive cables by means of a common pinion, the two cables running essentially parallel in an area of the pinion, the pinion being located between the two drive cables each drive cable engaging the pinion on a respective one of opposite sides of the pinion.

9. Motor vehicle roof, comprising:

an at least partially transparent roof section, a shade arrangement located underneath the transparent roof section, a first elongated member and a second elongated member located in succession in the lengthwise direction of the roof, the first elongated member comprising a take-up shaft, the second elongated member comprising one of a take-up shaft and a pull;

a length of shade which extends between the first and second elongated members, a first end of the length of shade being connected to the first elongated member and a second end of the length of shade being connected to the second elongated member, both the first and second elongated members being movable in the lengthwise direction of the roof for rolling the shade on and off of at least the take-up shaft of the first elongated member; and a common drive operably configured to move the first and second elongated members in opposite directions with respect to each other in the lengthwise direction of the roof, the drive comprising a motor and two compressively stiff drive cables which are driven in opposite directions by the motor and which act laterally on the first and second elongated members, wherein each of the drive cables has one end that acts laterally on one of the first and second elongated members and an opposite end that acts laterally on the other of the first and second elongated members.

* * * * *